Patented Sept. 1, 1925.

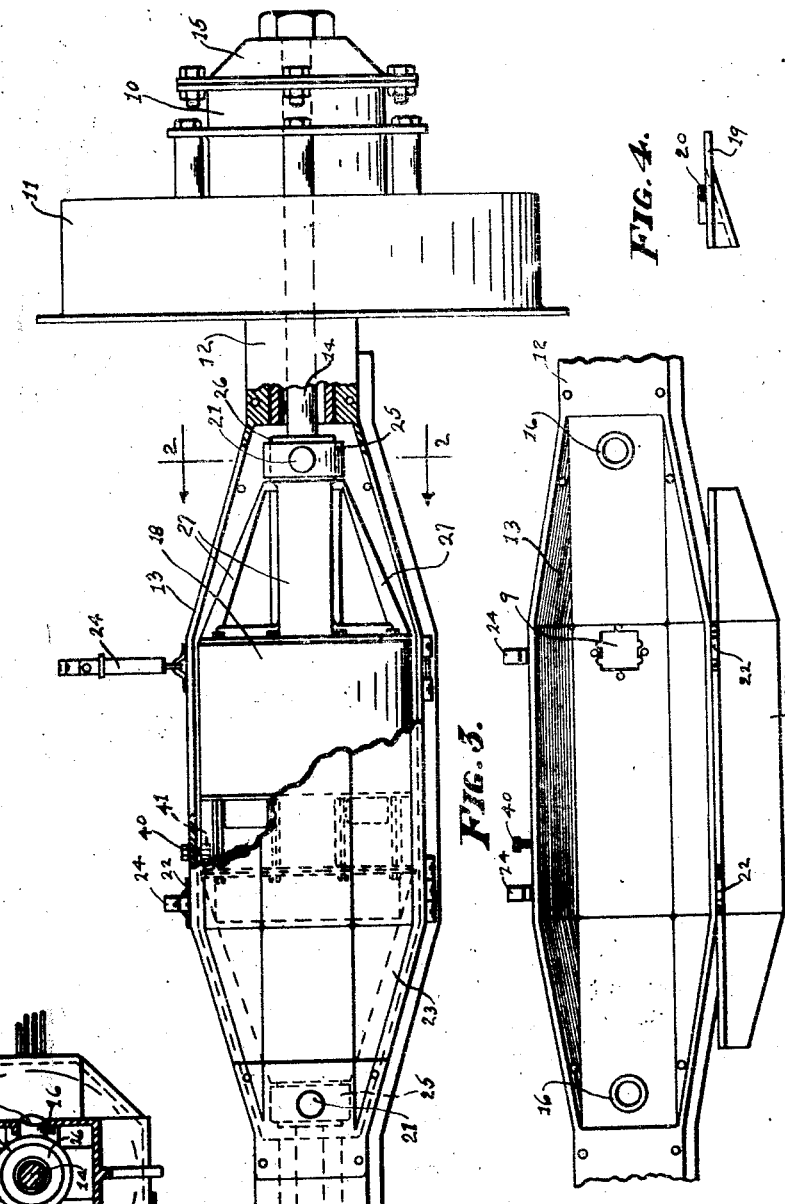

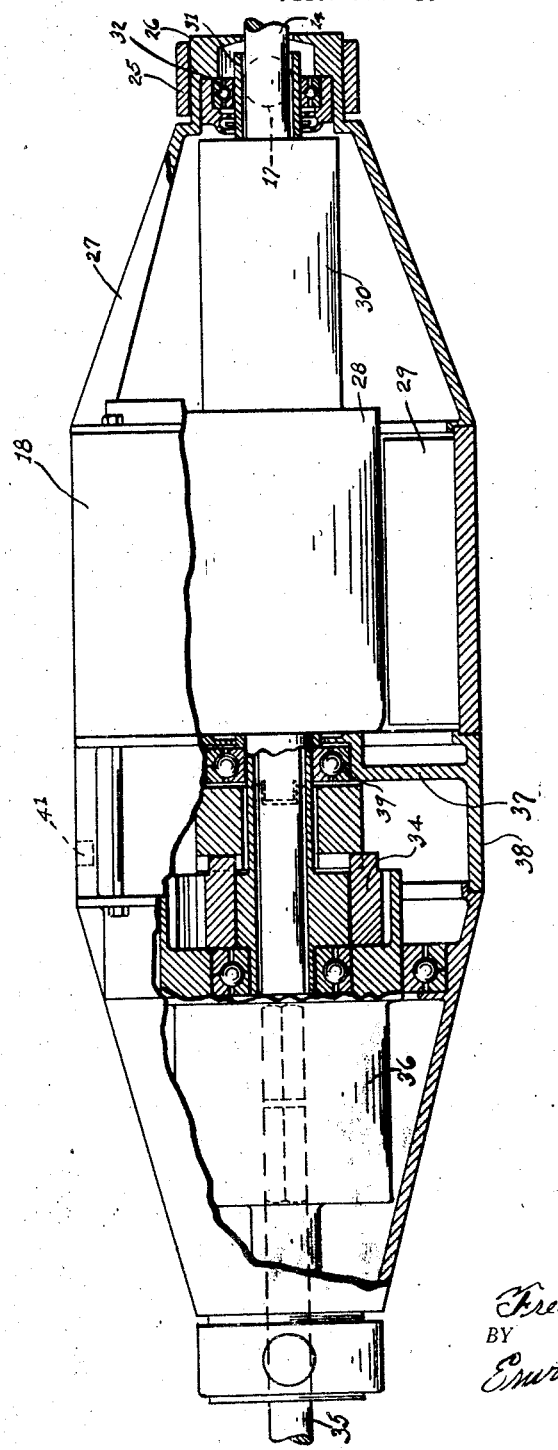

1,551,793

UNITED STATES PATENT OFFICE.

FRED H. BOGART, OF GREEN BAY, WISCONSIN.

DRIVING-AXLE STRUCTURE FOR MOTOR VEHICLES.

Application filed January 30, 1922. Serial No. 532,739.

*To all whom it may concern:*

Be it known that I, FRED H. BOGART, a citizen of the United States, residing at Green Bay, county of Brown, and State of Wisconsin, have invented new and useful Improvements in Driving-Axle Structures for Motor Vehicles, of which the following is a specification.

This invention relates to improvements in driving axle structures for motor vehicles. More particularly it relates to an axle construction especially designed for the mounting of an electrical driving unit of the type disclosed in the patent to Krohn, No. 1,032,068 of July 9, 1912.

The primary object of this invention is to provide a rear axle housing with an internal mounting, free from the stresses to which the housing is subjected, and adapted to support the so-called Krohn driving unit and associated mechanism, the said mounting being so connected with the axle housing that wearing strains and load strains will not be communicated to the driving unit and associated parts.

The so-called Krohn unit, which includes a driving motor, a set of reduction gearing, differential gearing, and the associated portions of the live axles, has proven to be a highly successful device for the application of electric motive power to the driving axle of a vehicle. But in actual service, with these units supported directly from the walls of the housing, the units have become damaged, the bearings disalined, and the live axles associated with such units have, in some instances, become bent, or pressed out of line, due to the yielding or deflection of the axle housing under the loads to which it has been subjected. Obviously, where this is done, even the slightest deflection of the housing throws the mechanism out of line and causes rapid deterioration in the motor or its connections. The difficulty is emphasized by the mounting of any portion of the unit upon the central part of the housing where the deflection of the housing is at a maximum.

More specifically stated, therefore, it is the object of this invention to overcome the difficulties heretofore experienced in the practical use of the Krohn driving unit, and it is proposed to float said unit within the rear axle housing in such a manner that the yielding of the housing will not be transmitted to any portion of the Krohn unit or to the live axles. To this end the unit is mounted as aforesaid in a shell or supplemental housing which is supported from the load carrying housing by trunnions disposed in a horizontal plane at points near the ends of the enlarged portion of the housing.

Further objects of this invention are to provide a mounting for a motor driving unit within an axle housing, whereby said unit will be rendered not only instantly accessible but also quickly removable for replacement or repair; to provide means, whereby, when repairs to the driving unit become necessary, the entire unit can be withdrawn and replaced by a similar unit in an exceedingly short space of time, so that the vehicle embodying this invention will not have to remain idle while its driving unit and related parts are being repaired; and to provide means whereby the supports of the driving unit may be machined in a lathe, thereby ensuring accuracy and mechanically perfect alinements at minimum cost.

In the drawings:

Figure 1 is a rear elevation of an axle housing and internal shell embodying this invention, a portion of the housing being broken away to expose said shell.

Figure 2 is a section taken on line 2—2 of Figure 1.

Figure 3 is a rear elevation of the housing with its cover plate open and the driving mechanism wholly removed therefrom.

Figure 4 is a detail view showing in plan one of the plates which aids in supporting the shell which carries the driving unit.

Figure 5 is a rear elevation upon an enlarged scale of a driving unit and its enclosing shell as used in connection with this invention, portions of the shell being broken away to expose the interior mechanism.

Like parts are identified by the same reference characters throughout the several views.

The hub of a vehicle wheel is represented at 10 and a brake drum 11 is associated therewith in the ordinary manner. The hub 10 is journaled upon the tubular portion 12 of the axle housing 13, and the axle 14 passes centrally through said housing and is provided at its end with a plate 15 which is bolted to the hub 10 of the wheel and serves to transmit thereto the rotation of the live axle.

It will be noted from the drawings, and particularly from Figure 3, that the axle housing 13 is cast in the form of a box, open at one side and provided at its ends with the integral tubular extensions 12 upon which the wheels are journaled. In the front side of the housing, adjacent each end of its open portion, are the interiorly projecting, socketed studs of bushings 16 which are adapted to receive trunnions 17 which support in part the shell or floating frame 18 within which the driving mechanism is mounted. The plates 19, provided with corresponding bushings 20, are adapted to be bolted to the housing in such a manner that the bushings 20 will register with the bushings 16. The bushings 16 and 20 are all in a horizontal plane which includes the axis of the housing. The trunnions 21 are supported in the bushings 20. Hinged to the housing 22 and adapted to close completely the cavity therein is a cover plate 23, the ends of which overlap the plates 19. When closed, the cover plate 23 may be secured by any desired means, such as the resilient clasping devices 24 which are best shown in Figure 2.

Each pair of trunnions 17 and 21 is carried by a collar 25 within which is rotatably journaled the tubular end portion 26 of the shell 18. This shell is integrally supported from the tubular end portion 26 by a plurality of spaced arms 27. Between the arms 27 are openings through which the air within the housing may circulate to cool the motor. These openings also afford access to the brushes and commutator of the motor, whereby these elements may be cleaned and adjusted without dismounting or dis-assembling the power unit. The commutator of the motor is indicated at 30 and will be understood to be provided with brushes and electrical connections in the usual manner. The showing of these connections and brushes has been omitted to avoid complicating the drawings. The electrical conduits through which current is supplied may be led into the housing 13 through the opening 9 therein.

In accordance with the disclosure in the patent to Krohn above referred to, the motor shaft 31 is tubular. It is supported at the end which carries the commutator 30 by a bearing 32 located within the tubular end portion 26 of the shell 18. It will be understood to extend through the motor into association with the reduction gear mechanism shown in the Krohn patent, which is here designated in its entirety by the numeral 34. It will be understood that by means of this reduction gear mechanism, the live axle shafts 14 and 35 are driven through a set of differential gearing, here designated by the numeral 36. The live axle shafts 14 and 35 are squared at their ends, as indicated in dotted lines in Figure 5, and may be withdrawn axially from the axle when they are released by unbolting the plates 15 from the hubs 10 of the wheels. It will be understood that the live axle 14 is disposed within the tubular shaft 31 of the driving motor, and passes axially through the reduction gear mechanism 34 into operative relation to the differential gear mechanism 36, in the manner disclosed in the Krohn patent.

A web 37 within the portion 38 of the internal shell 18 provides suitable means for mounting the bearing 39 in which the tubular motor shaft 31 is journaled. Additional bearings for the so-called Krohn unit may obviously be supported, as desired, from the shell 18. It will be clear that the driving mechanism which Krohn mounted directly within the axle housing is in the present invention disposed within the shell 18, which is in turn floated within the housing in such a manner that the twisting or deflection of the housing can not be communicated in any manner to the power unit.

It will be noted that the shell 18 is rotatably journaled within the swivelled brackets made up of collars 25 and trunnions 17 and 21. So far as has previously been disclosed herein, the shell 18 would be free to rotate within the axle housing 13 when the motor is operated. In order, therefore, to secure the shell 18 against rotation, so that the torque of the motor may be applied to the wheels, the bolt or pin 40 is provided. This bolt is threaded through the axle housing member 13 and is engageable within a recess 41 in the shell 18. Obviously, the pin 40 will secure the shell against rotation while permitting great freedom of movement of said shell relative to the housing 13.

It will be clear from the foregoing that this invention consists in the construction of a power unit to be removably mounted in an axle of the type disclosed herein, and to be so supported within the axle that the weight of the unit will be carried, as nearly as possible, by those portions of the axle which normally carry the load of the vehicle. In other words, the weight of the power unit in the device which forms the subject matter of this application is carried by those portions of the axle which are as near as possible to the wheels of the vehicle. Attention is further directed to the point already emphasized herein, namely, that the mounting of the power unit within the axle is such that under ordinary circumstances it will be impossible for any deflection of the load carrying axle to be communicated to the power unit in such a way as to injure the mechanism therein.

This invention has also made possible the construction of power units as articles of manufacture distinct from the load supporting axle of any vehicle. Accordingly, the owner of one or more motor trucks, which are provided with load supporting axles and power units of the type disclosed herein, may keep on hand a supply of extra power units for use in case of emergency. In the event that it becomes necessary to make repairs upon such a unit, this unit can be wholly removed from its place in the axle of the vehicle and a new unit can be substituted therefor in approximately twenty minutes, thereby keeping the truck in operation with a minimum loss of time.

The shell or frame 18 is formed in sections, each of which is so constructed as to allow the parts to be machined in a lathe for connection with each other, or with the Krohn unit, for insertion of bearings and for mounting the end collars, all machining work being done along circular lines. This ensures perfect alinements and mechanically perfect fitting.

By allowing the shell or frame to rotate slightly in the supporting collars and allowing the collars to pivot upon the horizontally disposed trunnions, all bending or torsional movement of the rear axle housing may be absorbed and the movable parts wholly relieved from the effects thereof.

I claim:

1. The combination with the load carrying axle of a vehicle and live axles disposed therein, of means for transforming electrical to mechanical energy and for communicating said mechanical energy to the live axles, said means being supported at its ends from the load carrying axle by flexible connections and removable as a unit from the load bearing axle.

2. The combination with the load bearing axle of a vehicle and live axles disposed therein, of means for transforming electrical to mechanical energy and transmitting the energy to the live axles while permitting differential movement between said axles, said means being disposed within the load bearing axle and being removable as a unit therefrom.

3. The combination with a load carrying axle, of a floating power unit within said axle, said power unit comprising a motor, transmission, and differential.

4. The combination with a load carrying vehicle axle, of a motor, transmission, and differential unit disposed therein, said unit being supported at its ends by flexible connections whereby a deflection of the load supporting axle will not be communicated to said unit.

5. An axle housing, live axles disposed therein, an electrical power unit including driving connections for the live axles, and means for flexibly mounting said unit within the housing.

6. The combination with a wheeled vehicle, of an axle housing adapted to sustain the vehicle from the wheels thereof, live axles within the housing and operatively connected to the wheels, a power unit within the housing, and means for supporting said unit from the housing at points adjacent the wheels, said power unit comprising a motor, transmission, and differential.

7. The combination with a vehicle provided with wheels, of a load supporting axle housing provided with bearings for the wheels, a set of axle shafts connected to the wheels and disposed within the housing, an electrical power unit within the housing operatively connected to said shafts and means for flexibly supporting said unit from the housing at points adjacent said bearings for the wheels, whereby any deflection of the housing will not be communicated to said unit or to said shafts.

8. The combination with a vehicle provided with wheels, of an axle housing provided at its ends with bearing for said wheels and recessed throughout its intermediate portion, of axle shafts connected to the wheels and disposed within said housing, an electrical power unit within the housing concentric to said shafts, means for supporting said unit from the housing adjacent the ends of the recess therein, and a closure plate adapted to enclose said recess.

9. The combination with an axle housing and live axles therein, of a motor, transmission, and differential unit adapted to drive said live axles, means for rotatably and pivotally mounting each end of said unit, and means for flexibly interlocking said unit with said housing for securing said unit against rotation.

10. The combination with an axle housing and live axles therein, of a motor unit disposed within said housing and operatively connected through suitable gearing to the live axles, collars journaled upon the ends of said unit, trunnions disposed transversely upon each collar, and means for removably supporting said trunnions from said housing.

11. The combination with an axle housing and live axles disposed therein, of a motor unit operatively associated with said axles, collars journaled upon the ends of said unit, trunnions carried by each collar having axes transverse to the axis of the collar bearings for each trunnion in the axle housing, and means for flexibly securing said unit to the housing at an intermediate point.

12. In a vehicle axle, a recessed housing, removable plates adjacent each end of the recess, swivelled brackets at each end of the recess journaled in the housing and in said plates, a motor, transmission, and differential unit within the housing, a set of live axles operatively associated with said unit, means for securing the unit against rotation, and a cover adapted to close the recess in the housing between said removable plates.

13. In a vehicle axle, an axle housing provided with a longitudinally disposed recess, a motor, transmission, and differential unit disposed within the recess, removable plates adjacent each end of the recess and contributing to the support of said unit therein, and live axles extending axially through said unit and through said axle housing into operative engagement with the differential gearing of said unit, said unit being removable from said housing by withdrawing said axle shafts and removing said plates.

14. The combination with a load carrying axle, of an interior motor supporting frame suspended within the axle by horizontally extending connections adapted to allow independent flexing movements of the axle in a vertical plane.

15. The combination with a load carrying axle, of an interior motor supporting frame having its ends pivotally connected with the axle at points substantially in a common horizontal plane.

16. The combination with a load carrying axle, of an interior frame, end members rotatably connected therewith, and horizontally extending pivot studs on the end members journaled in the axle to support the frame therefrom.

17. In a vehicle, the combination with a hollow load carrying axle, of a frame disposed within said axle and flexibly connected therewith at spaced points whereby to be relieved of strains imposed upon said axle, and wheel driving connections carried by the frame.

18. In a motor driven vehicle, the combination with a load carrying axle, of an interior frame provided with driving connections, and loose connections between the frame and axle, said connections extending substantially horizontally from the frame to the axle and adapted to allow independent yielding movements of the axle in a vertical plane.

19. The combination wth a load carrying axle, of interior collars each having horizontally alined pivotal connection with the axle at the respective sides thereof, a frame having its ends journaled in said collars, an interior projection on the axle adapted to loosely engage the frame to prevent rotation, and a power applying unit carried by the frame.

20. The combination with a non-rotative load carrying axle, of an interior power unit suspended therefrom and free from the effect of load strain flexion of the axle.

21. The combination with a non-rotative load carrying axle, of a power unit therein, a supporting frame therefor carried by the axle free from the effects of load strain flexion of the axle.

22. The combination with a load carrying axle, of a power unit therein, a supporting frame therefor carried by the axle free from the effects of load strain flexion of the axle, said frame being formed in sections, each annularly machined for mutual engagement and connection.

23. The combination with a load carrying axle, of a power unit therein, a supporting frame therefor carried by the axle free from the effects of load strain flexion of the axle, said frame having annularly machined surfaces for engagement with the power unit.

24. The combination with a load carrying axle, of a power unit therein, a supporting frame therefor carried by the axle free from the effects of load strain flexion of the axle, said frame having annularly machined surfaces for engagement with the power unit, and sections annularly machined for engagement with each other, whereby all of said surfaces may be fitted with mechanical accuracy.

25. The combination with a load carrying axle, of an interior frame flexibly connected with the axle at spaced points, wheel driving connections mounted in the frame and a live axle in splined relation to said connections and extending therefrom through said load carrying axle, said live axle being secured only at its outer end whereby to be freely removable from said connections to permit the bodily withdrawal of said frame and the connections mounted therein.

FRED H. BOGART.